United States Patent [19]

Bouknecht et al.

[11] 4,144,565
[45] Mar. 13, 1979

[54] INPUT/OUTPUT INTERFACE CONNECTOR CIRCUIT FOR REPOWERING AND ISOLATION

[75] Inventors: Max A. Bouknecht, Boca Raton; Louis P. Vergari, Palm Springs, both of Fla.

[73] Assignee: International Business Machines Corporation, Armonk, N.Y.

[21] Appl. No.: 757,403

[22] Filed: Jan. 6, 1977

[51] Int. Cl.[2] .............................................. G06F 3/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,408,632 | 10/1968 | Hauck | 364/200 |
| 3,639,909 | 2/1972 | Hauck et al. | 364/200 |
| 3,815,099 | 6/1974 | Cohen et al. | 364/200 |
| 3,911,400 | 10/1975 | Levy et al. | 364/200 |

Primary Examiner—Gareth D. Shaw
Assistant Examiner—Thomas M. Heckler
Attorney, Agent, or Firm—Robert W. Berray

[57] ABSTRACT

In a data processing system which includes a base central processing unit, channel, and input/output (I/O) interface to which peripheral devices may be attached, a special attachment is disclosed. The attachment made to the base I/O interface includes connector circuitry which is required when the signals on the input/output interface must be repowered to peripheral devices in an expansion input/output unit, power isolation must be provided between a base data processing system and I/O expansion unit, or a remote peripheral device is to be attached to the base data processing system I/O interface. The connector circuit includes logic which responds to the normal I/O interface signals to energize drivers in the connector circuit to achieve repowering of signals on bidirectional signal lines and unidirectional signal lines.

4 Claims, 3 Drawing Figures

INPUT/OUTPUT INTERFACE CONNECTOR CIRCUIT FOR REPOWERING AND ISOLATION

RELATED U.S.A. PATENT APPLICATIONS

The subject application is related to other applications having different joint inventorships filed on Apr. 30, 1976 and owned by the same assignee. These other applications are:

| Serial No. | Title | Inventor(s) |
|---|---|---|
| 681,982 | Address Key Register Load/Store Instruction System | R. E. Birney et al |
| 681,984 | Key Register Controlled Accessing System | R. E. Birney et al |
| 682,222 | Key Controlled Address Relocation Translation System | R. E. Birney et al |
| 682,223 | Outer and Asynchronous Storage Extension System | D. G. Bourke et al |
| 682,221 | Equated Operand Address Space Control System | R. E. Birney et al |
| 682,224 | Non-Translatable Storage Protection Control System | R. E. Birney et al |
| 681,985 | Supervisor Address Key Control System | R. E. Birney et al |
| 682,226 | System for Controlling Address Keys Under Interrupt Conditions | R. E. Birney et al |
| 681,953 | Task Management Apparatus | M. I. Davis |
| 682,002 | Data Processing System Featuring Subroutine Linkage Operations Using Hardware Controlled Stacks | M. I. Davis et al |
| 681,983 | Common Polling Logic For Input/Output Interrupt or Cycle Steal Date Transfer Requests | M. A. Bouknecht et al |
| 682,229 | Input/Output Interface Logic For Concurrent Operations | M. A. Bouknecht et al |
| 682,228 | Residual Status Reporting During Chained Cycle Steal Input/Output Operations | D. G. Bourke et al |
| 682,227 | Translator Lookahead Controls | D. G. Bourke |

BACKGROUND OF THE INVENTION

This invention is directed to digital computer systems, and more specifically to the interaction between peripheral I/O units and a central processor in the computer system.

The control of transfer of data between the storage of the central processing unit and peripheral I/O devices over an input/output bus, or interface, can take many forms. Among the forms of input/output control for the purpose of data transfer are, direct program instruction control for each transfer of data, the initiation of data transfers by a central processor after which subsequent data transfer is accomplished under control of the peripheral device without use of the central processor, and logic for handling interrupt requests from peripheral devices to inform the central processor of peripheral device status. Included in various of these concepts are control mechanisms for permitting peripheral devices to initiate interrupt handling in the central processor by directly informing the processor of the device and status requiring handling, or the interrupt request may require the central processor to initiate a polling signal to all attached devices, in series, to subsequently permit information to be transferred to the central processor identifying the device and status causing the interrupt.

In systems utilizing direct program control for each data transfer between a peripheral device and main storage, interfaces are usually provided which require, in response to the program instruction, the sequential transfer of device addresses commands, and/or data to the peripheral device.

In data processing systems which not only provide for direct program control data transfers, but also cycle steal data transfers, different forms of program instructions are normally required. Even if different forms of initiating instructions are not required, different forms of peripheral device control information are required, which must be recognized by the peripheral device control unit and handled differently. Therefore, each peripheral device control unit must have specialized logic. Further, if the input/output control system is also required to handle asynchronous requests for interrupt servicing by the processor, additional circuitry in the peripheral device control unit must be provided.

During cycle steal data transfer operations when a peripheral device control unit has been provided with sufficient information to initiate and control further use of the interface bus for controlling the storage unit independent of the processor, certain exceptional conditions may occur prior to completion of the data transfer requiring special handling by the central processor before re-initiating the data transfer.

Normally, input/output control systems which are adapted to handle direct program control, cycle steal, or interrupt request transfers on a common interface, must handle each of these situations exclusively on the interface bus, preventing any other form of request from being processed.

In prior systems, polling logic has been provided for responding to an unknown interrupt request which signals the priority of the interrupt request. I/O control logic responds with a serial poll signal combined with identification from the central processor of the priority of the interrupt request being polled, to cause selection by a proper peripheral device control unit for subsequent use of the interface bus. The priority interrupt request made by a peripheral device control unit can be modified by a central processor. However, in these prior systems, the modification of the priority level of a peripheral device control unit could only be accomplished when the device associated with the peripheral device control unit is not busy with some previous command. Further, prior art systems which combine cycle steal data transfers with interrupt request handling have been required to provide separate logic within a peripheral device control unit and input/output control logic of the central processor to poll for the two forms of communication required.

Prior systems which incorporate a serial poll signal for the purpose of selecting one of a plurality of peripheral device control units, all of which are requesting service, require use of logic within each peripheral device control unit to propagate the serial poll signal to succeeding devices. In these prior systems it is readily evident that if a particular peripheral device control unit, or device, were physically removed from the input/output bus, proper functioning of the poll propagation would not be possible.

Further complications in a data processing system result when more peripheral devices are attached to the I/O interface than can be handled due to insufficient driving power from a channel. If an extension is made to an interface bus that includes bidirectional signal lines through use of a special attachment, the drivers on the special attachment must normally be provided with additional control information to indicate the direction of signals on the bus. If an extension to the interface bus includes its own power supply, fluctuations may cause erroneous signals on the original bus. Further, a special attachment would normally be required if it were desired to repower signals from the base system to a single remote peripheral device.

SUMMARY OF THE INVENTION

In view of the above mentioned complications resulting from the need to extend the capabilities of a base data processor which includes a central processing unit, channel, and input/output interface bus with attached peripheral devices, it is a primary object of the present invention to provide a common attachment card to the base input/output interface bus to permit repowering of signals on the base interface bus to either an extension of the interface bus or remote peripheral devices.

It is another object of this invention to provide a common attachment card including connector circuitry for responding to normal interface control signals to control the proper repowering of signals on interface lines which are bidirectional.

An additional object of this invention is to provide an interface attachment card which includes connector circuitry to an additional interface bus which can provide power isolation between the base interface bus and the further extended interface bus which includes its own power supply.

Another object of the present invention is to provide an interface attachment card which includes some logic in the connector circuitry that would normally be included in a remote peripheral device for responding to certain of the control signals on the interface bus for accomplishing serial poll capture at the attachment card.

These and other objects are achieved by providing connector circuitry on an attachment card of a base input/output interface which includes bidirectional signal lines as well as unidirectional signal lines, and which includes bidirectional drivers, unidirectional drivers, and logic means which responds to normal interface signals between any peripheral device and the channel of a base data processing system to control the direction of signal transfer on the bidirectional signal lines. Additional logic is provided with the bidirectional drivers to respond to a normal interface signal from a further interface to isolate the base interface during power fluctuations. Certain logic is also provided which would normally be included in a peripheral device to shorten the signal path required for serial poll capture on the interface.

DETAILED DESCRIPTION

Data Processing System

Figure 1:
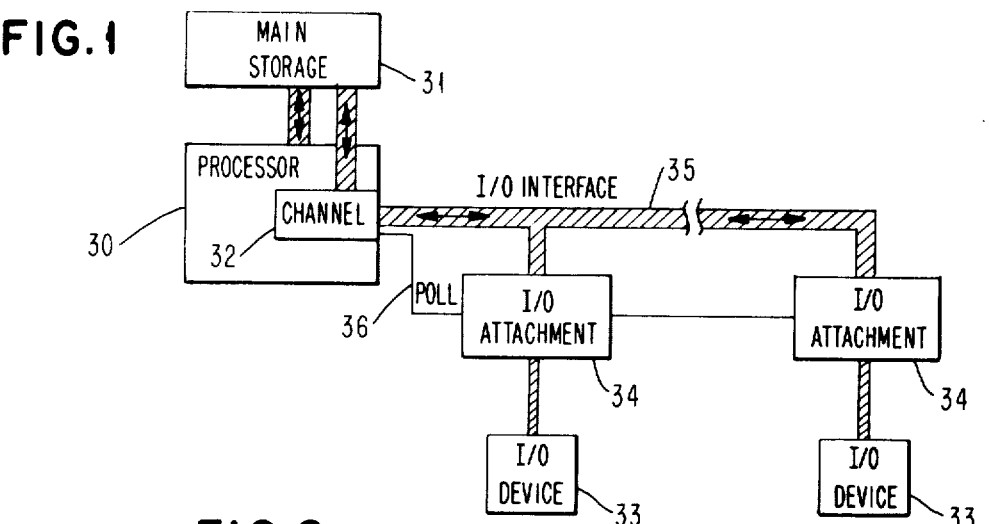
FIG. 1 is a block diagram showing the major components of a data processing system utilizing the present invention.

The total environment of the invention is depicted in FIG. 1. The present invention is utilized in a data processing system that includes a central processing unit (CPU) 30, a main storage unit 31 for storage of data, machine instructions, and input/output (I/O) control information, and I/O control logic (Channel) (32). The invention deals with the control of the transfer of data and control information to I/O devices 33 through peripheral device control units or I/O attachments 34 utilizing an I/O interface (I/F) bus 35 which connects the various units in parallel for the transfer of data, address information and control information. Also shown is a poll signal on a line 36 which interconnects the peripheral device control units 34 in series for the purpose of selecting a particular I/O device 33 for attachment to the I/O interface 35 during a particular transfer cycle.

Figure 2:
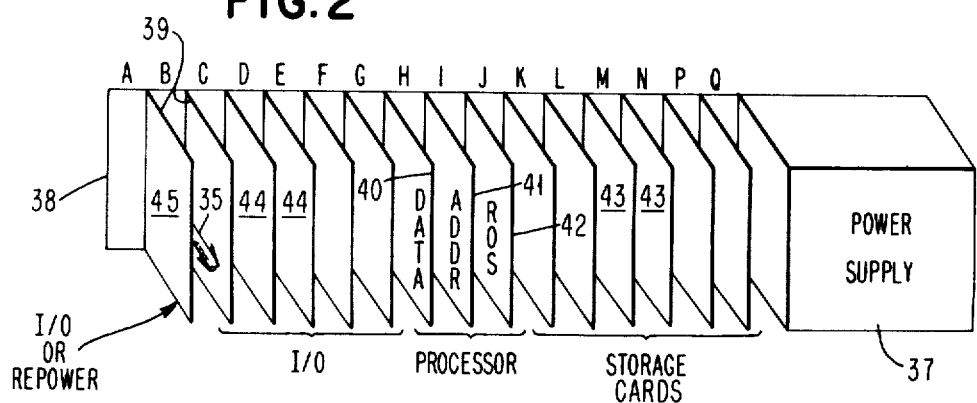
FIG. 2 is a representation of the physical configuration of a data processing system utilizing the present invention.

A physical representation of the data processing system utilizing the present invention is shown in FIG. 2. The physical arrangement includes a power supply 37, a rack, or card file 38, and a plurality of pluggable cards 39 containing the circuits making up the various units of the data processing system.

Three cards 40, 41, and 42 include circuits which comprise the processor 30. Various parts of the I/O control logic 32 are distributed on the processor cards. A number of storage cards 43, depending on the amount of storage desired, are plugged into the card file 38.

The I/O attachment 34 as shown in FIG. 1 is represented by each of a selected plurality of cards 44. If it is desired to attach additional I/O devices to the system, a repower and isolation card 45 may be included. The repower card 45 has the function of repowering the I/O interface lines 35 to an additional rack and isolating the components shown in FIG. 2 if any additional racks should lose power and thereby normally render the I/O interface 35 ineffective.

Card 42 is a read only store (ROS) card containing a microprogram control mechanism for the data processing system. The address (ADDR) card 41 contains all the program accessible hardware such as data and status registers, and forms addresses used to access the storage unit 31 and I/O devices 33. The DATA card 40 performs all arithmetic and logical operations and provides the gating for data to and from the I/O interface 35 and the storage unit 31.

Interface Lines

Figure 3:
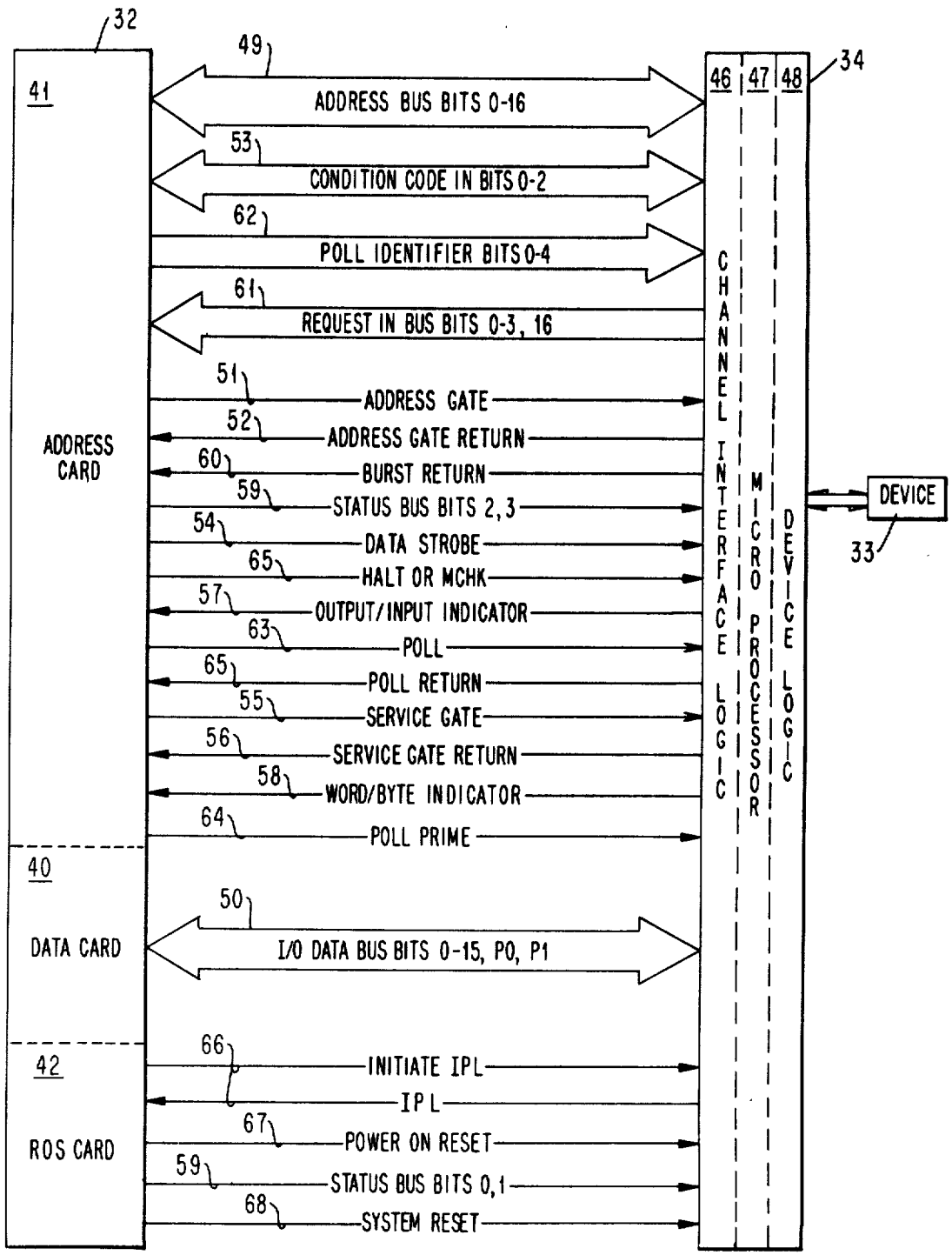
FIG. 3 identifies the lines of an input/output (I/O) interface (I/F) bus interconnecting I/O control (Channel) logic in a central processing unit (CPU) and a peripheral device control unit in accordance with the present invention.

In FIG. 3, there is depicted the I/O control logic for channel 32 distributed between the address card 41, data card 40, and read only store card 42. Also depicted is an I/O attachment card 44 of FIG. 2 for a peripheral device 33. The interface bus 35 in accordance with the present invention may accommodate any number of different devices 33. However, in accordance with a preferred embodiment of the present invention, each I/O attachment card 44, which represents a peripheral device control unit, will have common circuitry divided between channel logic 46 and a microprocessor 47. Added to the common circuitry is device logic 48, which is dependent upon the particular device 33 to be controlled.

Subsequent discussion of the operation of a peripheral device control unit 34, in accordance with a preferred embodiment of the present invention, will discuss operation of a micro processor 47. However, the common circuitry 46 and 47 could be comprised of only combinatorial and sequential logic.

There are three basic forms of communication between an I/O device 33 and the I/O control logic 32 which, depending on the type of device 33 may require use of up to 81 lines on the I/O interface 35. Two forms of communication are initiated by a program instruction identified as Operate I/O (OIO). These two forms of communication are primarily for exchange of data, and are identified as a direct program control (DCP) transfer or cycle steal (CS) transfer. In the DPC form of transfer, each OIO instruction effects the transfer of one item of information between the storage unit 31 and I/O device 33 in either direction. The cycle steal form of transfer is initiated by the processor 30, and involves the transfer of I/O command information to the peripheral device control unit 34 for subsequent use by the peripheral device control unit 34 to control the transfer of a plurality of items of data between the storage unit 31 and peripheral device 33. This transfer is independent of, and concurrent with, other processor 30 operations. The third form of communication required between the processor 30 and device 33, is the initiation of program interrupt sequences in the processor 30 in response to requests for processor service by a peripheral device 33.

The interaction of the I/O control logic 32, interface bus 35, and peripheral device control unit 34 to accomplish these forms of communication will now be discussed in detail.

Each of the 81 lines of the I/O interface 35 will now be briefly defined utilizing the representation in FIG. 3. There are two bidirectional busses essential to the operation, and these include a 17-bit, bidirectional, address bus 49, and a 16-bit plus two parity bit I/O data bus 50.

To control communication on the I/O bus 35 in response to the decode of an OIO instruction, for the purpose of transferring data or I/O control information on the data bus 50, requires use of the address bus 49. Other interface lines required to control the transfer are address gate 51, address gate return 52, condition code in bus 53, and data strobe line 54, which will be energized in proper sequence to control the communication.

During cycle steal (CS) communications, transfer of data on the data bus 50 and storage unit 31 address information on the address bus 49 is effected from the device control unit 34. Additional lines on the interface bus 35 required for this type of transfer include a service gate signal 55, service gate return 56, input/output indicator 57, word/byte indicator 58, and a four-bit status bus 59 distributed between the read only store card 42 and address card 41. If the central processor 30 and storage unit 31 have a storage protect mechanism installed, the condition code bus 53 is utilized during CS operations to transfer a storage protect key from the device control unit 34 to the storage protect mechanism.

Normally, transfer of cycle steal information between the I/O control logic 32 and device control unit 34 involves a single transfer followed by selection of another device for further operations. An additional type of transfer may be implemented, and would be identified by a signal on a line labeled burst return 60. The burst return signal 60 energizes controls in both the device control unit 34 and I/O control logic 32 to permit, in response to one selection of the device 33, a plurality of transfers of cycle steal information on the I/O bus 35 before selecting another device.

A third basic form of communication involves the requirement to signal the I/O control logic 32 that a particular device 33 desires to interrupt the central processor 30. The interface 35 lines primarily involved are a request in bus 61 and a poll identifier bus 62. To explain more fully, a device control unit 34 will have been assigned a particular priority interrupt level by means of a prepare command. The interrupt level assigned may be one of four different levels, although the concept of the invention in this regard can accommodate up to 16 different levels. When a device 33 requires interrupt service, a portion of the channel interface logic 46 of the peripheral device control unit 34 will energize a particular one of the four lines on bus 61 indicating an interrupt request. The particular one of the lines on bus 61 energized is associated with the priority interrupt level assigned. One additional line in the bus 61 is identified as bit 16, and is energized to inform the I/O control logic 32 of a need for transfer by a device 13 utilizing the cycle steal form of transfer.

When a particular device 33 has signalled either a priority interrupt request, or cycle steal request, on bus 61, interrupt control logic in the I/O control logic 32 and processor 30 determines which one of a plurality of priority levels or cycle steal requests can be acknowledged to establish connection between the I/O control logic 32 and device 33. The poll identifier bus 62 is coded with binary information to indicate which interrupt priority level is being acknowledged, or will signal a particular binary code on the poll identifier bus 62 indicating that any cycle steal request is being acknowledged.

As part of the selection of a device 33 to be permitted connection to the I/O bus 35 in response to an interrupt request or cycle steal request, the I/O control logic 32 generates a poll signal 63 and a poll prime signal 64. The poll signals 63 and 64 are propagated serially through all device control units 34 attached to the interface bus 35. As part of the device selection for use of the bus 35, the poll and poll prime signals 63 and 64 interact with the coded information on the poll identifier bus 62 to cause a particular device control unit 34 to be selected. When a peripheral device control unit 34 recognizes a poll identification on bus 62 corresponding to its present priority interrupt level, or that it requires cycle steal transfer and recognizes the particular identification code, and also receives the poll and poll prime signals 63 and 64, the selection is made, and this fact is returned to the I/O control logic 32 on a signal line poll return 65. Receipt by a device control unit 34 of the poll and poll prime signals 63 and 64, and in the absence of recognizing a proper code on the poll identification bus 62, will cause the device control unit 34 to propagate the poll and poll prime signals 63 and 64 to succeeding peripheral device control units 34.

Additional signal lines on the interface bus 35, not previously discussed and which do not form part of the present invention, are included in the preferred embodiment of the I/O bus 35. These lines include a halt or machine check signal line 65 for halting a device previously started, two lines 66 utilized for control and transfer during an initial program load from a device 33 to storage unit 31, power on reset line 67 to cause all logic in the device control units 34 to be reset to a known state, and system reset line 68 for establishing known conditions in response to processor controls.

A more detailed description of the logic, timing, and interaction of signals on the interface bus 35 between the I/O control logic 32 and peripheral device control units 34 is found in U.S. Pat. No. 4,038,641, Ser. No. 681,983 to M. A. Bouknecht et al entitled "Common Polling Logic For Input/Output Interrupt Or Cycle Steal Data Transfer Requests" and assigned to the assignee of the present application.

Figure 4:
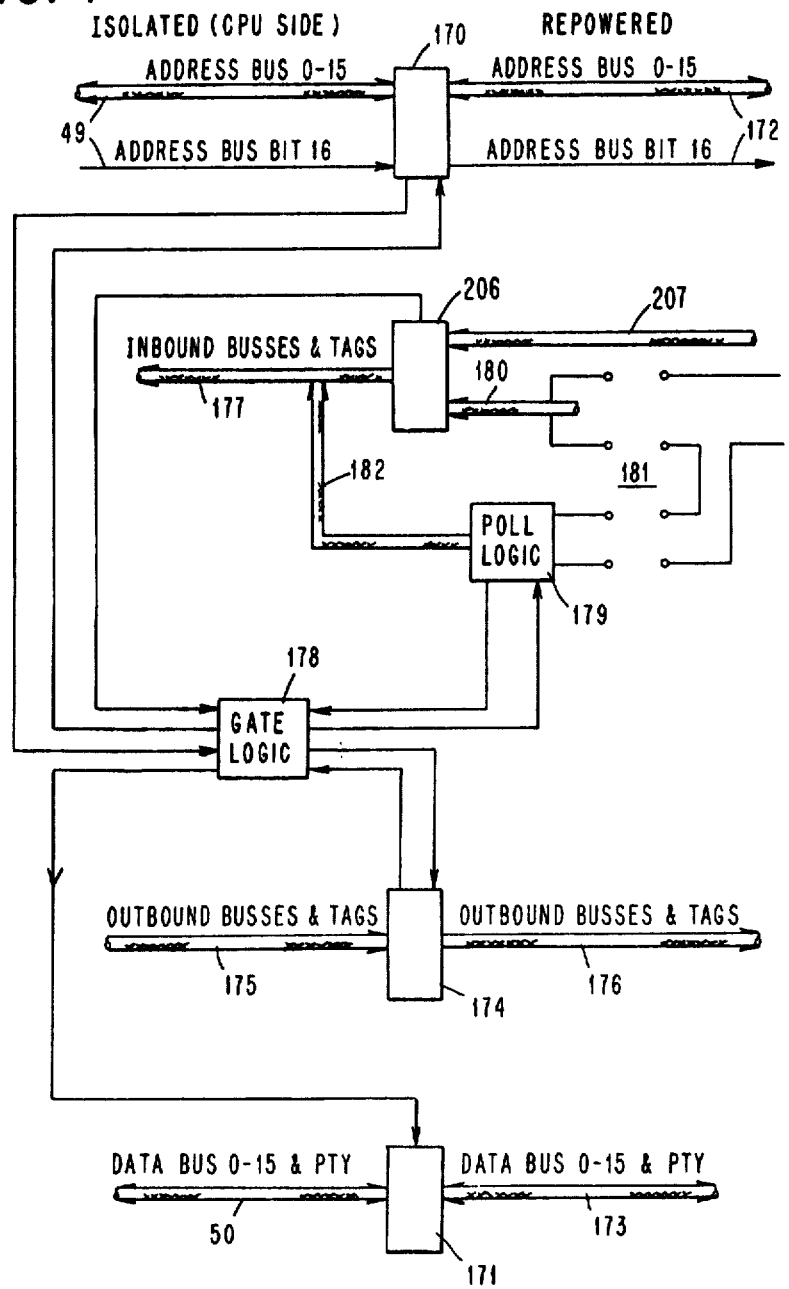
FIG. 4 is a general block diagram of the connector circuitry of a base I/O interface attachment card in accordance with the present invention.
Figure 5:
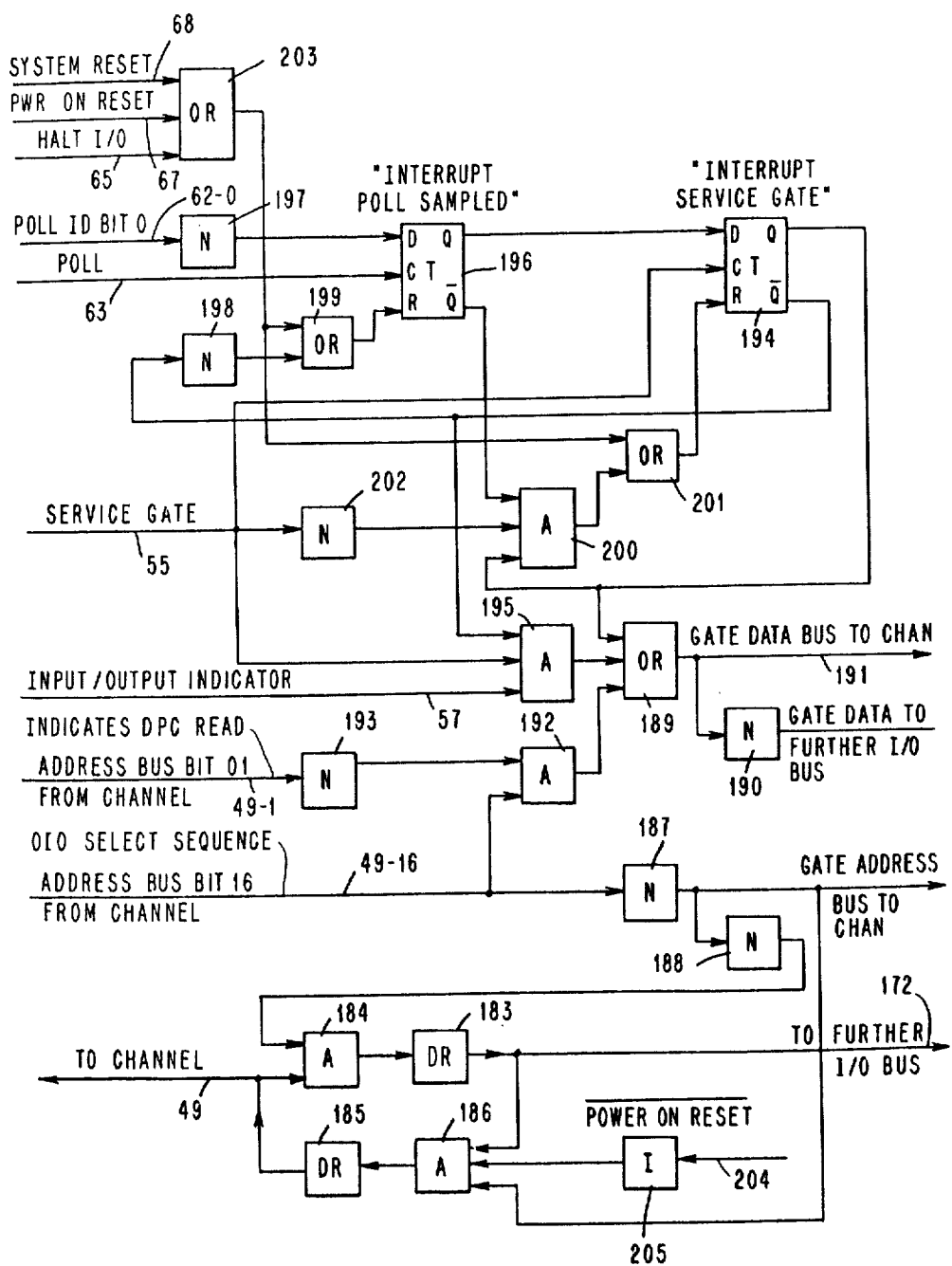
FIG. 5 is a detailed logic diagram of gate control logic of FIG. 19 which responds to normal control signals of an input/output interface bus for controlling proper energization of a pair of drivers to provide proper signal transfer in either of two directions on a bidirectional bus.

FIGS. 4 and 5 show details of the connector circuitry included on an attachment card such as 45 shown in FIG. 2. The processor cards 40, 41, and 42 are capable of handling a predetermined number of peripheral devices attached to I/O cards 44 which are included in the base data processing system depicted in FIG. 2. In certain cases, it may be required that additional peripheral device must be attached to the base unit and these will normally be included in a cabinet such as that shown in FIG. 2 which includes a power supply 37, a rack, or card file 38, and additional I/O device attachment cards 44. The connector circuitry on the repowering card 45 will be effective to interconnect the signal lines of the interface bus 35 of the base unit of FIG. 2 to the further interface bus 35 of the expansion unit.

FIG. 4 is a block diagram of the repower attachment card 45 of FIG. 2. The interface connector circuitry includes bidirectional drivers 170 and 171 which interconnect the address bus 49 and data bus 50, respectively, of the base data processing sytem of FIG. 2 to the further input/output interface which also includes a bidirectional address bus 172 and data bus 173.

Unidirectional drivers 174 respond to various outbound busses and tags from the channel of the base data processing system on a bus depicted at 175 and repower these signals to corresponding signal lines on a further interface on a bus shown at 176. Unidirectional drivers 206 respond to signal lines of a bus 207 from a further interface bus to repower and drive various inbound bus and tag signal lines on the bus 177 to the channel of the base data processing system.

Gate logic 178, to be more fully described in connection with FIG. 5, responds to certain of the normal signal lines involving transfer of address, data and other control signals between the channel of the base data processing signal and connected peripheral devices, to control the energization of a proper driver of the bidirectional drivers 170 and 171 to ensure transfer of information on these bidirectional busses is in the proper direction. As a result of this, additional information over and above that normally transmitted on the interface, is not required to determine which direction drivers 170 and 171 are to be effective.

FIG. 4 shows a block 179 labeled poll logic. The attachment card directly connected to the interface of the base system for accomplishing repowering to an extension unit of I/O devices can be utilized to interconnect the base system interface to a peripheral device which may be physically many feet from the base system interface, such that repowering of the interface signal lines is required to provide proper control to the physically remote peripheral device. As part of the interface operation, a serial poll, poll prime, and poll return signal must be generated to determine the particular peripheral device to utilize the interface in response to interrupt or cycle steal requests. If the poll signal, poll propagate, or poll return signal is required to traverse the path from the interface to the remote peripheral device, time will be lost in operation of the interface. Therefore, as part of the present invention, the attachment card which provides repowering is also provided with the poll logic 179 which, in combination with a further set of inbound busses and tags on a bus 180, and terminals, noted generally at 181, to which the remote peripheral device may be attached, the poll capture, propagate, or poll return signalling can be achieved at the attachment card itself. This saves the propagation time of signals to and from the remote peripheral device for the purpose of poll capture as previously described.

Signals such as interrupt request 161, or cycle steal request 121, would be received from the remote peripheral device into the poll logic 179 for the purpose of energizing a proper one of the interrupt request in bus signal lines 61. A bus 182 connected to the bus 177 provides this information. The poll logic 179 would also include the logic which would respond to an interface poll ID on lines 62 in combination with the priority level assigned to the peripheral device in register 169 to achieve the poll capture, poll propagate, or poll return signalling on the interface of the base system.

FIG. 5 shows more detail of the logic of the connector circuitry on the repowering attachment card 45 of FIG. 2 which responds to certain signals on the interface bus of the base system, energized during normal interface utilization, for controlling the direction of signal transfer on the bidirectional address bus 49 or data bus 50.

Only a single bidirectional signal line of the address bus 49 is shown at the bottom of FIG. 5. All other signal lines of the address bus 49 and all of the signal lines of the data bus 50 would be depicted identically. Associated with each bidirectional signal line, is a first driver 183 enabled by a first AND gate 184 for enabling the driver 183 to generate signals on the further interface bus 172, in accordance with inforation on the address bus signal line 149. A second driver 185 and a second AND gate 186 will be effective to generate signals in the opposite direction, that is from information on the further I/O bus 172 to the channel of the base system on line 49.

The logic for controlling the direction of signal transfer on the bidirectional address lines includes a first inverter circuit 187 and a second inverter circuit 188. In earlier descriptions, it was indicated that the only time address information is being generated from the channel to all peripheral devices attached to the interface bus is during initial selection of a peripheral device in response to an OIO instruction in the central processing unit. When this occurs, address bit 16 on the address bus 49 is caused to be a binary 1. When bit 16 of the address bus 49 is a binary 1, it is inverted to a binary 0 by inverter 187 and reinverted to a binary 1 by inverter 188 to enable AND gate 184 to respond to the information on the address bus signal line 49. This enables the driver 183 to repower the information to the further interface bus signal line 172. In all other cases, bits 16 of address bus 49 will be a binary zero, which when inverted by inverter 187, will enable AND gate 186 to enable driver 185 to repower signals from the further interface bus 172 onto the address bus 49 to the channel. This operation is effective during cycle steal data transfers in which the peripheral device transmits address information to the central processing unit.

For each bidirectional signal line of the data bus 50, a pair of drivers 183, 185 and enabling AND gates 184 and 186 would be included. The selective and alternate generation of either of the drivers will be controlled by the output of an OR circuit 189 and inverter 190. The logic for determining the direction of signal transfer on the data bus is depicted in the remainder of FIG. 5.

A first situation in which data is to be gated from the further interface bus to the channel, as signalled on a line 191, is indicated by an AND circuit 192 which receives information from address bus 49 bit positions 1 and 16. A binary 1 on address bus signal line 49-16, as previously indicated, indicates the initial selection of a peripheral device in response to an OIO instruction. During the initial selection, if the selection is for the purpose of effecting a direct program control (DPC) read operation, bit position 1 of the address bus 49 is part of the command code indicating a read command and will be a binary 0 which is inverted by an inverter 193 to enable AND circuit 192 to generate a signal through OR circuit 189 enabling the peripheral device to transfer data to the channel in response to the read command.

An interrupt service gate trigger 194 and an AND circuit 195 indicate another situation in which the drivers of the bidirectional data bus are to transfer information to the channel as indicated by a signal on line 191. During a cycle steal data transfer by a peripheral device, a binary 1 will be indicated on line 57 as being an input cycle steal operation, and the servicing of the cycle steal data transfer will be indicated by the normal service gate signal on line 55. The only other determination that must be made for this particular situation is that the service gate signal 55 is not being generated for the purpose of handling interrupts, this being signalled by the fact that trigger 194 will be in the off condition providing the third enabling input to AND circuit 195.

The third input to OR circuit 189 is the binary 1 signal indicated by the fact that trigger 194 is in the on, or set state, which causes the information on the bidirectional data bus to be gated to the channel because an interrupt service is in process. Information such as interrupt ID must be gated to the CPU to be placed in internal registers. An interrupt poll sample trigger 196 remembers that a poll for an interrupt service has been received on line 63 when the poll ID bit 0 on line 62-0 is binary 0, inverted through an inverter 197.

Therefore, the trigger 196 sets only when a poll for an interrupt has occurred, as opposed to a poll for a cycle steal operation. When the trigger 196 has been set and is active, the next service gate signal received on line 55 will be effective to set trigger 194.

When the interrupt service gate trigger 194 is turned on, the interrupt poll sampled trigger 196 is reset through an inverter 198 and OR circuit 199. An AND circuit 200 through an OR circuit 201 is effective to reset the interrupt service gate trigger 194. This occurs when the interrupt poll sample trigger 196 has been reset and the service gate on line 55 has fallen, as indicated through an inverter 202, indicating completion of the interrupt service cycle.

A further OR circuit 203 responds to various signals on the interface from the channel and are effective to reset all of the logic shown in FIG. 5.

One additional feature of the present invention is effected by an additional input to the AND gate 186 associated with all of the bidirectional signal lines. When an additional card file and power supply are to be added to the base system, the power supply system will include a signal line called power on reset which is comperable to the power on reset signal line 57 of the base data processing system. The normal condition of a power on reset signal on the line 204, associated with the further interface bus, is deactivated, for a binary 0 condition. Through the operation of inverter 205, AND gate 186 will remain enabled. Even if the power supply of the further interface bus is turned off, the interface of the base system can continue the function with all the devices directly attached to it. Any attempt to select a peripheral device on the further interface bus would merely cause a condition code of 0 to be returned to the channel indicating that it is inoperative. Since the driver 185 represents only a single load on the interface signal line 49, no matter how many peripheral devices on the further interface bus are removed, there will be no adverse effect realized with signal levels on the interface of the base system.

The function of the input 204 from the power supply of the further interface is that when power on reset is effected, line 204 becomes positive which disables AND gate 186. During the process of power on reset, in which various components on the further interface bus are switching states and signal conditions, these extraneous signals will not be propagated through AND gate 186 to the interface bus of the base system.

There has thus been shown, in accordance with the present invention, standard connector circuitry included on an attachment card for connection to an interface bus of a base data processing system, for the purpose of repowering both bidirectional and unidirectional signal lines. The simple logic responds to normal signals on the interface to control the direction of signal transfer on the bidirectional busses. Additional logic is not required in either the channel or on the attachment card to recognize address information indicating the need to energize the drivers for the purpose of sending signals to a further input/output interface bus. Also, propagation delays for critical polling signals is reduced by including, on the connector circuitry attachment card, certain logic which would normally be associated with the peripheral device physically remote from the interface bus. Further, adverse effects of power fluctuations or spurious signals associated with a further interface bus are eliminated, or isolated, through the operation of simple logic on the repowering card.

What is claimed is:

1. A data processing system input/output (I/O) interface connector circuit for controlling the interconnection of data, address, and control signal lines between a first I/O bus associated with a central processing unit including an I/O channel and attached peripheral devices, and a further I/O bus, comprising:

bidirectional driver means interconnecting data and address lines of the first I/O bus and corresponding data and address lines of the further I/O bus;

unidirectional driver means interconnecting control lines of the first and further I/O bus; and logic means, connected and responsive to predetermined signals being transferred between any peripheral device and the I/O channel, and connected to said bidirectional driver means, for controlling the direction of signal transfer on the data and address lines.

2. A connector circuit in accordance with claim 1 wherein each said bidirectional driver means includes:
   a first driver for generating signals on the further I/O bus;
   a second driver for generating signals on the first I/O bus;
   a first gate connected for enabling said first driver, and connected and responsive to signals on the first I/O bus and said logic means;
   a second gate connected for enabling said second driver, and connected and responsive to signals on the further I/O bus and said logic means; and
   said logic means includes means for selectively rendering either said first or said second gate effective.

3. A connector circuit is accordance with claim 2 wherein:
   said second gate is connected and responsive to a predetermined signal on a predetermined one of the unidirectional control signal lines of the further bus for rendering said second gate inoperative.

4. A connector circuit in accordance with claim 1 wherein certain of the peripheral devices are directly attached to the first I/O bus in a multi-drop configuration and include interface capture logic responding to a poll signal from the I/O channel to either serially propagate the poll signal to a succeeding peripheral device or degate the poll signal to capture use of the I/O bus, and at least one peripheral device is directly attached to the further I/O bus, the connector circuit further including:
   interface capture logic including means connected and responsive to the presence or absence of a request signal from the at least one peripheral device to render said interface capture logic effective to degate or propagate, respectively, the poll signal; and
   means directly connecting said interface capture logic to certain of the control signal lines of the first I/O bus.

* * * * *